United States Patent [19]

Denney et al.

[11] Patent Number: 4,854,942
[45] Date of Patent: Aug. 8, 1989

[54] CONTROL OF PH IN WATER QUENCH OF A PARTIAL OXIDATION PROCESS

[75] Inventors: Kimberly K. Denney, Friendswood; Norman G. Block, Houston, both of Tex.

[73] Assignee: Quantum Chemical Corporation, New York, N.Y.

[21] Appl. No.: 226,256

[22] Filed: Jul. 29, 1988

[51] Int. Cl.⁴ .............................. L10J 3/46; C10J 3/84
[52] U.S. Cl. .................................... 48/197 R; 48/206; 48/212; 48/215; 210/634; 252/373
[58] Field of Search ................... 48/197 R, 206, 212, 48/215; 252/373; 210/634

[56] References Cited

U.S. PATENT DOCUMENTS

| | | | |
|---|---|---|---|
| 4,014,786 | 3/1977 | Potter et al. | 210/22 R |
| 4,141,695 | 2/1979 | Marion et al. | 48/197 R |
| 4,205,962 | 6/1980 | Marion et al. | 48/197 R |
| 4,205,963 | 6/1980 | Marion et al. | 48/197 R |
| 4,211,638 | 7/1980 | Akell et al. | 208/180 |
| 4,465,596 | 8/1984 | Soyez | 210/634 |
| 4,466,810 | 8/1984 | Dille et al. | 48/197 R |
| 4,588,418 | 5/1986 | Gabler et al. | 48/197 R |
| 4,597,773 | 7/1986 | Quintanna | 48/197 R |
| 4,705,537 | 11/1987 | Yaghmaie et al. | 48/197 R |

Primary Examiner—Peter Kratz
Attorney, Agent, or Firm—Kenneth D. Tremain

[57] ABSTRACT

In a partial oxidation process, the gaseous effluent from the generator is contacted with water to cool the synthesis gas and remove the solid particulates of ash and soot. The water from this operation is then mixed with an organic extractant and feed into a decanter to form aqueous and organic phases. The aqueous phase from the decanter is feed to a water flash separator to remove dissolved gases. The solids are removed from the water flash separator in an aqueous stream which is processed for removal of undesirale sulfides, cyanides, metals and particulate matter and steam stripped for removal of undesirable gases while retaining quantitites of ammonia therein. The overhead, an ammonia containing aqueous stream, is recycled for the control of pH in the quench scrubber vessel and the attendant equipment utilized to process the aqueous phase from the decanter.

11 Claims, 1 Drawing Sheet

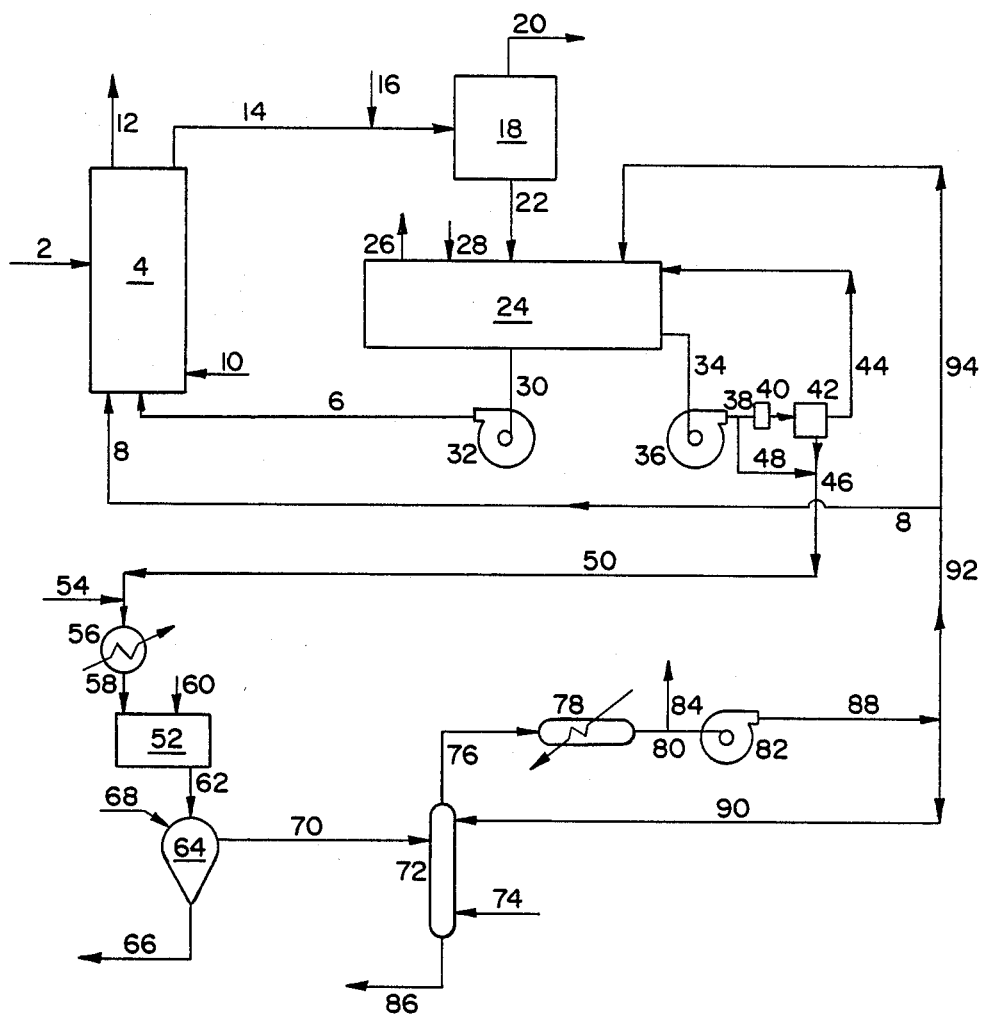

CONTROL OF PH IN WATER QUENCH OF A PARTIAL OXIDATION PROCESS

BACKGROUND OF THE INVENTION

1. Field of the Invention

This invention relates to the production of synthesis gas by the partial oxidation of hydrocarbonaceous materials. More particularly, this invention relates to controlling the pH of water used to quench and scrub raw synthesis gas.

2. Description of the Prior Art

The partial oxidation of hydrocarbonaceous materials to produce synthesis gas, a mixture of hydrogen and carbon monoxide, is well known in the art. A wide variety of carbon-containing materials have been employed as feed to partial oxidation processes including both solid carbonaceous fuels, such as coal, lignite, oil shale and tar sands, as well as liquid carbonaceous fuels, such as heavy fuel bottoms and residua. The carbonaceous fuel is introduced into the gas generator together with a free-oxygen containing gas to produce the mixture of raw synthesis gas which contains entrained solids, e.g., soot and ash, as well as quantities of other gases, which may include $H_2O$, $CO_2$, $H_2S$, COS, $CH_4$, $NH_3$, $N_2$ and Ar. The raw synthesis gas exits from the reaction zone at a temperature in the range of 1300° to 3000° F. The hot synthesis gas passes from the generator and is scrubbed and quenched with a water stream to remove soot and ash and cool the gas. The water stream, containing soot and ash, as well as some of the gases from the synthesis gas, is then mixed with naphtha and introduced into a decanter where two phases form. A soot-rich naphtha phase is removed from the decanter for further processing while an aqueous phase, commonly known as gray water, is removed for further processing. This aqueous phase contains dissolved salts, dissolved gases and ash while the organic phase consists of an organic extractant and the soot, i.e., particulate carbon. The use of a quench-scrubber and the two phase decanter is taught in U.S. Pat. Nos. 4,014,786 of Potter, et al. and 4,141,695 of Marion, et al. U.S. Pat. Nos. 4,141,695; 4,205,962 and 4,205,963, all of Marion, et al., 4,466,810 of Dille, et al. and 4,588,418 of Gabler, et al. all disclose the processing of the aqueous phase whereby it is sent to a flash column to remove gases, followed by settling to remove particulate matter therefrom with a subsequent recycle of the recovered water to the quench-scrubber. The organic extractant-soot phase may be treated to recover the extractant for reuse and to incorporate the particulate carbon into the hydrocarbonaceous material serving as feed to the synthesis gas generator as disclosed in Marion '695 and U.S. Pat. Nos. 4,211,638 of Akell, et al., 4,705,537 of Yaghmaie, et al. and the Dille and Gabler patents disclose the use of a hydrocyclone for the removal of particulate matter from the gray water. The use of surfactants to promote the separation of particulate matter is disclosed in Dille (cationic polyelectrolyte polymer) and Yaghmaie (anionic sulfonated product of humic acids or their salts). The process disclosed in Yaghmaie does not employ an inorganic extractant, but rather separates the particulate ash and dissolved materials without employing an organic extractant or the decanter employed in other prior art processes. Marion '695, '962 and '963, Dille and Gabler disclose the recycling of the water for reuse in the quench-scrubber after the water has been processed to remove significant quantities of particulate matter and dissolved gases.

U.S. Pat. No. 4,588,418 of Gabler, et al. discloses the use of water to remove ash and soot from the synthesis gas, the mixing of the water with an organic extractant, the separating of these two streams in a decanter to form an aqueous phase and an organic phase, the subsequent treatment of the aqueous phase in a flash separator to remove dissolved gases and the separation of the solids from the water bottoms of the flash separator in a hydrocyclone with a recycle of the remaining water to the quench scrubber.

A purge stream from the hydrocyclone which contains the solids from the water flash bottoms in concentrated form, is normally about 5 to 25% of the total water flash separator bottoms and is adjusted to keep the ash concentration at reasonable levels in the remaining water recycled to the synthesis gas quench system. Both acidic compounds, such as formic acid, as well as basic compounds, such as ammonia, are formed in the partial oxidation reaction and in the subsequent quenching process. The use of some hydrocarbonaceous feedstocks employed in the partial oxidation process result in an unacceptable acidic pH in the quench system, which in some prior art processes is alleviated by the injection of anhydrous ammonia or aqueous ammonia directly into the high pressure quench system or to the portion of the water flash separator bottoms stream that is recycled to the quench portion of the process. Additions of sodium hydroxide to raise the pH in this system is not appropriate, because the presence of sodium can cause additional ash formation resulting in unacceptable fouling of the processing equipment.

It is an object of this invention to provide effective control of pH in the water quench-scrubber system and in the subsequent water processing portion of a partial oxidation process.

It is a further object of this invention to utilize available streams having a basic pH for use in controlling the pH in the water-scrubber and attendant water processing equipment in a partial oxidation process.

It is a further object of this invention to process and recycle ammonia-bearing water as a means of controlling the pH in the water-quench scrubber and attendant waste processing equipment of a partial oxidation process.

The achievement of these and other objects will be apparent from the following description of the subject invention.

SUMMARY OF THE INVENTION

In accordance with the present invention, a purge stream from the water flash separator employed in a partial oxidation process is processed to remove particulates and other undesirable materials from the stream and recycled back for injection into the high pressure quench-scrubber or to the lower pressure water flash separator for controlling the pH in the aqueous recycle system above about 4.5. In particular, a water stream from the water flash separator may, optionally, be filtered and passed through a hydrocyclone and either the water stream itself or the purge from the hydrocyclone may then be contacted with chemicals to remove metals, cyanides and sulfides and is then permitted to settle for removal of solid reaction products in a clarifier. The solids are removed from the clarifier and the clear overflow passes to an ammonia stripper column where steam strips the dissolved gases, including ammonia, which pass overhead for condensation along with a significant portion of the water. This condensate is recycled, partly to the stream stripper, as reflux, and, partly as a means for controlling the pH in the water quench and gray water processing portion of the partial oxidation process. This pH control stream may be recycled to the water flash separator from whence it is ultimately recycled back to the quench-scrubber or, alternately, it may be sent directly to the quench-scrubber. However, since the quench-scrubber operates at a higher pressure than the water flash separator, an additional pump or a higher pump discharge pressure may be required for recycling this pH control stream to the quench-scrubber.

More particularly, this invention relates to improvements in a partial oxidation process for producing gaseous mixtures containing $H_2$, CO, water, particulate carbon, gaseous materials including one or more of $CO_2$, $H_2S$, COS, $CH_4$, $NH_3$ and $N_2$ and ash particles comprising materials including vanadium, sulfur, nickel, iron, calcium, sodium, molybdenum, or their reaction products, including sulfides and cyanides, by the partial oxidation of a hydrocarbonaceous feed with an oxygen-containing gas; contacting the gaseous mixture with water in a vessel for conducting a gas quenching or scrubbing step or both; removing from this vessel a water stream from this vessel containing particulate carbon, dissolved gaseous materials and suspended ash particles; adding a liquid organic extractant to the stream, feeding the stream to a decanter wherein an aqueous ash-bearing phase and an organic carbon-bearing phase separate; removing from the decanter the aqueous phase comprising water, dissolved gaseous material, some particulate carbon, and the suspended ash particles; feeding the aqueous phase to a water flash separator wherein a portion of the dissolved gases are flashed off, and removing from the bottom of the water flash separator the remaining liquid phase comprising metals, sulfides, cyanides, solid materials and ammonia for recycle to the quenching or scrubbing step and purging part of this liquid phase; the improvements comprising:

(a) treating the purge stream to form solid materials from the metals, sulfides and cyanides, (b) removing the solid materials from the treated purge stream, (c) subjecting the treated purge stream to stripping to provide a condensible aqueous overhead, (d) condensing the aqueous overhead to provide an ammonia-containing aqueous stream, and (e) recycling a first portion of the ammonia-containing aqueous stream for incorporation into the quenching or scrubbing step in an amount effective to maintain the pH at above 4.5 in the quenching or scrubbing step.

BRIEF DESCRIPTION OF THE DRAWINGS

The drawing is a schematic flow plan of an embodiment of the subject invention.

DESCRIPTION OF THE PREFERRED EMBODIMENTS

The present invention relates to improvements in the partial oxidation of hydrocarbonaceous feedstocks to produce a synthesis gas and, in particular, to the improvements relating to the maintenance of an acceptable pH in the water recycle system used to quench cool and scrub the synthesis gas to remove objectionable ash and particulate carbon. The water quenching and scrubbing process has also been found to be effective to remove water soluble gases from the synthesis gas. The present invention is an improvement over U.S. Pat. No. 4,588,418, the contents of which are incorporated herein by reference. This patent relates to improvements in the water recycle system and in particular is directed to concentrating suspended ash particles by means of a hydrocyclone to remove particles having a maximum diameter of 10 mm from the aqueous stream after it passes through the water flash separator.

The synthesis gas produced by the partial oxidation of hydrocarbonaceous materials combined with a free-oxygen containing gas in a gas generator contains significant quantities of undesirable materials. The raw synthesis gas, substantially comprising $H_2$ and CO, may also contain other gases such as $H_2O$, $CO_2$, $H_2S$, COS, $CH_4$, $NH_3$, $N_2$ and Ar and contains entrained solids of particulate carbon, also known as soot, and ash. Further, the raw synthesis gas exiting from the gas generator is at a temperature in the range of about 1300° to 3000° F. Therefore, it is usually essential to cool the synthesis gas and remove substantial quantities of the undesirable solids and gases present. One useful means for achieving this is to contact the hot raw synthesis gas with water to quench-cool and scrub the water soluble gases and particulate solids from the gas. This is achieved in a quench-scrubber vessel from which the cleansed synthesis gas is removed for further use. The effluent water stream, often referred to as black water or carbon water, is processed, in most instances for removal of the particulate carbon and ash and the dissolved gases. This is conventionally achieved by mixing the black water with a liquid organic extractant, such as naphtha, to preferentially remove the particulate carbon. The resulting aqueous liquid is referred to as gray water. The two-phase mixture is passed to a decanter where the carbon-containing organic extractant is separated from the ash-containing gray water. The naphtha phase is processed for a recovery of the naphtha for reuse and reintroduction of the carbon into the hydrocarbonaceous feed stream to the gas generator. The aqueous stream is sent to a water flash separator which, not only removes the dissolved gases, but also concentrates the suspended solids in a portion of the water which is subsequently purged from the system. In U.S. Pat. No. 4,588,418 the entrained solids are removed by a combination of a strainer and a hydrocyclone. The filtered effluent is returned to the water flash separator while the purge from the hydrocyclone, containing separated solids, is removed for disposal in a water treatment facility. This purge stream can normally comprise 5 to 25% of the total water flash separator bottoms stream and is adjusted to maintain the ash concentration at reasonable levels in the remaining portion of the water which is recycled to the synthesis gas quench-scrubber system.

Acidic compounds, such as formic acid, as well as basic compounds such as, ammonia, are formed during the partial oxidation and quenching processes. Ideally, the aqueous portion of the processing stream should be maintained at an acceptable pH level of about 4.5 to 7. In some instances, the hydrocarbonaceous feed stocks used to generate the synthesis gas do not provide sufficient basic compounds to maintain the desired pH in the aqueous portion of the system. Control of the pH by additions of sodium hydroxide is not appropriate in these systems, since impurities, such as sodium, can cause additional ash formation resulting in undesirable fouling of the process equipment. In some instances, anhydrous ammonia or aqueous ammonia has been directly injected into the high pressure quench system or into the portion of the water flash separator bottoms stream which is recycled to the quench-scrubber portion of the process.

It has now been discovered that the purge stream removed from the water flash separator bottoms to effect removal of undesirable solids contains sufficient quantities of ammonia which could be employed for pH control in the system. Unfortunately, this purge stream not only contains significant quantities of solids, but also undesirable levels of metals, sulfides and cyanides. The subject invention is directed to processing this purge stream or any portion of the water separator bottoms containing solids to remove undesirable solids and other compounds therefrom and recycle the aqueous ammonia containing stream for use in controlling the pH in the aqueous portion system of the synthesis generation process. Briefly, this purge stream is treated to remove cyanides, sulfides and metals and is then filtered or passed through a clarifier for removal of solids. Finally, the aqueous stream is subjected to steam stripping to provide an ammonia containing overhead, a substantial portion of which is recycled for use as a pH control stream.

The improvements described herein can be illustrated by reference to the drawing which presents a flow plan depicting an embodiment of this invention. Hot raw synthesis gas 2 passes from a partial oxidation reactor (not shown) into a water quench-scrubber 4. This raw synthesis gas contains primarily hydrogen, carbon monoxide and carbon dioxide. The hot raw synthesis gas can also contain quantities of $H_2S$, COS, $CH_4$, $NH_3$, $N_2$ ash containing metals, soot (unoxidized carbon particles) and other compounds, including sulfides and cyanides. In quench-scrubber 4, the hot raw synthesis gas is cooled by recycled water entering through lines 6 and 8 and make-up water, as required, through line 10. The water also removes solid soot and ash particles from the synthesis gas as well as significant quantities of water soluble gases. The thus cleaned synthesis gas passes from quench scrubber 4 through line 12 for further use and/or processing. The water effluent from quench scrubber 4 passes through line 14 where it is mixed with a liquid organic extractant, such as naphtha, entering through line 16. The combined streams enter decanter 18 where the phases separate producing a carbon rich-naphtha phase removed through line 20 for treatment (not shown) to separate the naphtha for reuse and the soot for incorporation into the hydrocarbonaceous feed introduced into the synthesis gas generator. The aqueous phase, termed "gray water", passes from decanter 18 through line 22. The gray water contains dissolved gases such as CO, $H_2$, $CO_2$, $H_2S$, COS, $CH_4$, $NH_3$ and $N_2$, as well as most of the ash and some of the soot. The gray water is introduced into water flash separator 24 where gases are flashed off and pass overhead through line 26. Any water flashed off is condensed and returned through line 28. Other sources of water such as that condensed from the synthesis gas, as well as make-up water, may also be introduced into the system through line 28.

The major portion of the water passes from water flash separator 24 through line 30 and pump 32 for recycle through line 6 for reuse in quench scrubber 4. The solids collecting in water flash separator 24 are removed therefrom together with a quantity of gray water through line 34 and pump 36 and line 38. In one embodiment, this stream is passed through filter 40 to remove the larger particulate matter and through hydrocyclone 42 to remove the smaller particulate matter. This purified gray water is then recycled through line 44 back to water flash separator 24. A purge stream, containing particulate matter, is removed from the bottom of hydrocyclone 42 through line 46 or further processing. In an optional embodiment, the discharge from pump 36 is bypassed around filter 40 and hydrocyclone 42 for further processing in a fashion similar to the further processing of purge stream in line 46 to be described hereinafter. The processing of either of these steams proceeds as follows. The particulate containing gray water from line 46 or line 48 flows through line 50 to reactor 52 for further processing. This gray water may contain particulate matter such as soot and ash as well as other impurities such as ammonia, hydrogen sulfide, carbon dioxide, cyanides, sulfides, iron, calcium, vanadium, and nickel. Other aqueous purge streams from the synthesis gas system, containing similar impurities, may be feed through line 54 to be processed along with the gray water flowing through line 50.

In a preferred embodiment, before the gray water and the other purge streams are processed in reactor 52, they are passed through heater 56 to heat the stream to a temperature of about 90° to about 110° C. in order to increase the efficiency of the removal of the undesired material which is initiated in reactor 52. The use of a heater is not critical since these materials can ultimately be removed without increasing the temperature of the streams being treated. However, by not practicing this preferred embodiment, these materials will be removed subsequently in a stream where their presence interferes with the biological process employed to process this stream. (This alternate will be discussed in more detail hereinafter.) The heated stream passes from heater 56 through line 58 into reactor 52 where chemicals are added through line 60. These chemicals are added in amounts effective to cause removal of cyanides, sulfides and metals from the stream and to maintain a pH of at least about 10.5 in the feed to a downstream stripper (described hereinafter) thereby maintaining sufficient quantities of ammonia in the overhead from this stripper and preventing excessive quantities of ammonia and $SO_4^{-2}$ in the stripper bottoms. Ferrous sulfate has been found to be an effective compound to coagulate metal particles and to convert sulfides and cyanides to solid precipitates of ferrous sulfate, ferrocyanide and ferrous hydroxide which can be separated by gravity settling. Ferrous sulfate should be added in quantities effective to provide a theoretical ferrous sulfate concentration in reactor 52 of about 500 to about 800 ppm. Caustic or lime and the like can be added through line 60 in appropriate quantities to effectively maintain the desired pH.

Materials to be removed by this chemical treatment in reactor 52 are converted into solid reaction products and congulated metal particles. The gray water, together with the solid reaction products and metal particles, passes from reactor 52 through line 62 into clarifier 64 where the solid materials are permitted to settle out. These solid materials are removed from clarifier 64 through line 66 for solid waste disposal.

Despite the removal of cyanides, sulfates and metals, a flock is often present in the treated gray water. This floc can be effectively removed by the use of known and commerically available flocculating agents. Particularly useful are the synthetic organic polymer flocculants commercially available in cationic, anionic, nonionic and polyampholytic forms. Anionic polymeric flocculants are particularly preferred. A discussion of flocculants is presented in *Kirk-Othmer, Encyclopedia of Chemical Technology*, Vol. 10, "Flocculating Agents," Pages 489-523, particularly Pages 499-509 (3d ed. 1980), which is incorporated herein by reference. Those skilled in the art will be familiar with the flocculants available and the ones to employ and can determine the quantities required to effectively remove the floc without an undue amount of experimentation. The flocculant can be added to clarifier 64 through line 68. The agglomerated floc will be removed with the solid materials passing from clarifier 64 through line 66.

The clarified overflow flows from clarifier 64 through line 70 to ammonia stripper 72. Steam introduced into the column through line 74 drives off dissolved gases including $NH_3$ and a quantity of the water. The overhead from the stripper flows through line 76 to condenser 78 from whence it flows through line 80 to pump 82. Any uncondensed vapors are vented to a flare (not shown) through line 84. Stripper bottoms pass from the column through line 86 for final treatment in a biological waste water treatment plant (not shown).

Where a heater is not employed upstream of reactor 52, the temperature of the treated stream will range from ambient to about 40° C. Since this temperature will, in some instances, not be high enough to permit sufficient reaction between the ferrous sulfate and the cyanides and sulfides to cause substance removal of the latter materials as solid reaction products from clarifier 64 through line 66, they will be removed with the stripper bottoms through line 86. Although removal in this fashion is effective to provide a clean aqueous ammonia containing stream for recycle in accordance with the present invention, the presence of cyanides and sulfides in the stripper bottoms can cause difficulties when this stream is processed in the biological waste water treatment plant. Consequently, the use of heater 56 is the preferred embodiment for the subject invention.

Condensed water passes from pump 82 to line 88 from whence a portion is recycled through line 90 to provide reflux to steam stripper 72. The balance of the ammonia-containing water flows through lines 92 and 94 for recycle to water flash separator 24 from which it eventually can be recycled back to quench-scrubber 4. Alternately, this stream may pass from line 92 to line 8 for direct recycle to quench-scrubber 4 although this will require a higher discharge pressure from pump 82 in view of the fact that quench-scrubber 4 operates at a significantly higher pressure than water flash separator 24. The concentration of ammonia in this recycled water ranges from 4 to 7% $NH_3$ while the individual concentrations of such materials as sodium, nickel, vanadium, calcium and silica are normally less than 1 ppm each. Chlorides in this stream are approximately 30 ppm. Although the volume of this recycle required in streams 94 or 8 to provide the required pH in the quench-scrubber will vary significantly with the nitrogen concentration of the various partial oxidation feedstocks, one having ordinary skill in the art can readily determine the required volume of ammonia-containing recycle without an undue amount of experimentation. In most instances, about 2 to about 25% of the ammonia-bearing water will attain a pH above 4.5 to prevent corrosion in the Cr-Mo steel, stainless steel, and carbon steel equipment normally employed in the water quench system.

Modifications and variations of the invention as hereinbefore set forth may be made without departing from the spirit and scope thereof. Therefore, only such limitations should be imposed on the invention as are indicated in the appended claims.

What is claimed is:

1. In a partial oxidation process for producing gaseous mixtures containing $H_2$, CO, water, particulate carbon, gaseous materials including one or more of $CO_2$, $H_2S$, COS, $CH_4$, $NH_3$ and $N_2$ and ash particles comprising materials including vanadium, sulfur, nickel, iron, calcium, sodium, molybdenum, or their reaction products, including sulfides and cyanides, by the partial oxidation of a hydrocarbonaceous feed with an oxygen-containing gas; contacting the gaseous mixture with water in a vessel for conducting a gas quenching or scrubbing step or both; removing from this vessel a water stream containing particulate carbon, dissolved gaseous materials and suspended ash particles; adding a liquid organic extractant to the stream; feeding the stream to a decanter wherein an aqueous ash-bearing phase and an organic carbon-bearing phase separate; removing from the decanter the aqueous phase comprising water, dissolved gaseous material, some particulate carbon, and the suspended ash particles; feeding the aqueous phase to a water flash separator wherein a portion of the dissolved gases are flashed off, and removing from the bottom of the water flash separator the remaining liquid phase comprising metals, sulfides, cyanides, solid materials and ammonia for recycle to the quenching or scrubbing step and purging part of this liquid phase; the improvement comprising:

(a) treating the purge stream to form solid materials from the metals, sulfides and cyanides, (b) removing the solid materials from the treated purge stream, (c) subjecting the treated purge stream to stripping to provide a condensible aqueous overhead, (d) condensing the aqueous overhead to provide an ammonia-containing aqueous stream, and (e) recycling a first portion of the ammonia-containing aqueous stream for incorporation into the quenching or scrubbing step in an amount effective to maintain the pH at above 4.5 in the quenching or scrubbing step.

2. A process according to claim 1, including the following additional step:

(f) subjecting the stripped bottoms from step (c) to biological waste water treatment.

3. A process according to claim 1, wherein the first portion of the ammonia-containing aqueous stream of step (e) is recycled to the water flash separator for eventual recycling to the quench-scrubber vessel.

4. A process according to claim 1, wherein the first portion of the ammonia-containing aqueous stream of step (e) is recycled directly to the quench-scrubber vessel.

5. A process according to claim 1, wherein the remaining liquid phase removed from the water flash separator is subjected to filtration and processing in a hydrocyclone to provide (1) the remaining liquid phase for recycle to the quenching or scrubbing step and (2) a purge from the hydrocyclone as the purge stream of step (a).

6. A process according to claim 1, wherein the treating of step (a) is performed by combining the purge stream with ferrous sulfate in an amount effective to cause the metals, sulfides and cyanides to form solids which are separated from the purge stream.

7. A process according to claim 1, wherein the treating of step (a) includes heating the purge stream to a temperature of about 90° to about 110° C.

8. A process according to claim 1, wherein the removal of solid material in step (b) is performed by introducing the treated purge stream into a clarifier.

9. A process according to claim 1 including the following additional steps after step (a):

treating the purge stream which contains floc with an effective amount of an organic polymer flocculant and removing agglomerated floc from the treated purge stream.

10. A process according to claim 1, wherein an effective amount of caustic or lime is added to step (a) to maintain a pH of at least about 10.5 in the treated purge stream of step (c).

11. A process according to claim 1, wherein the stripping of step (c) is effected in a steam stripper and a second portion of the ammonia-containing aqueous stream is introduced into the steam stripper as reflux.

* * * * *